No. 646,520. Patented Apr. 3, 1900.
P. K. DEDERICK.
BALING PRESS.
(Application filed May 22, 1899.)
(No Model.) 2 Sheets—Sheet 1.
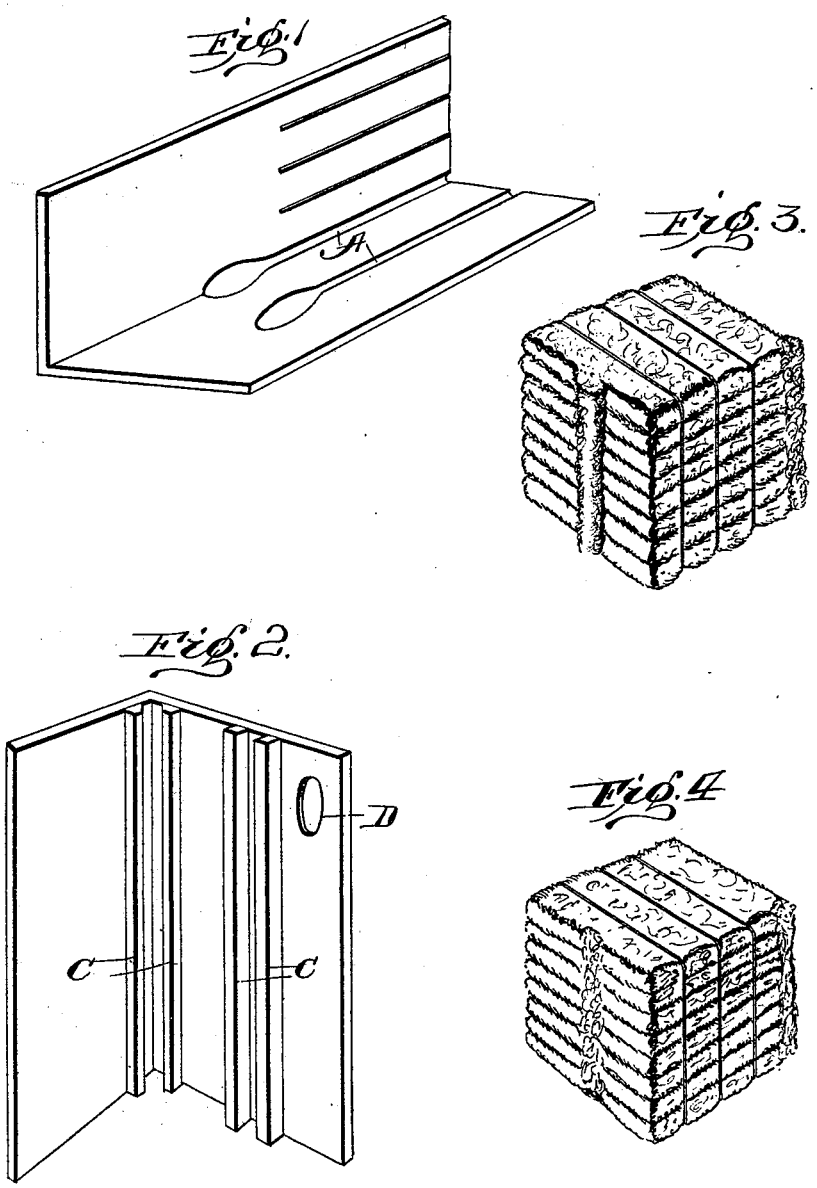

No. 646,520. Patented Apr. 3, 1900.
P. K. DEDERICK.
BALING PRESS.
(Application filed May 22, 1899.)
(No Model.) 2 Sheets—Sheet 2.

UNITED STATES PATENT OFFICE.

PETER K. DEDERICK, OF LOUDONVILLE, NEW YORK.

BALING-PRESS.

SPECIFICATION forming part of Letters Patent No. 646,520, dated April 3, 1900.

Application filed May 22, 1899. Serial No. 717,861. (No model.)

*To all whom it may concern:*

Be it known that I, PETER K. DEDERICK, of Loudonville, county of Albany, State of New York, have invented new and useful improvements in baling-presses for forming bales which may be sampled with ease and rapidity, of which the following is a specification.

Heretofore in sampling bales of cotton or other material it has been customary to bore into them with an instrument and with it pull out tufts of cotton; but recent requirements of solid bales from lint-cotton the first pressing operation, without repressing, renders this method of sampling difficult and impracticable to extract sufficient cotton for a sample. Thus, moreover, this old method is slow and imperfect, as the sample obtained represents but one portion of the bale. By my invention herein disclosed bales may be formed with which sampling requires no instrument, is instantaneous, and the sample represents every part of the bale. I accomplish this by constructing chamber or box of the press to form a ridge of loosely-pressed cotton on a side or corner of the bale extending in the direction the bale was pressed, so that the sections or charges in the bale form part of this sampling-ridge.

My invention may be carried out with any baling-press with suitable changes of construction of the press-box.

The following explanations, with the drawings forming part of this specification, more particularly set forth my invention, reference being had to the letters of reference marked thereon.

Figure 1 represents a sectional baling-press, and Fig. 2 a box baling-press, both provided with my improvements to form a sampling-ridge of loose pressed cotton on the bales and which may be formed to project or to be within the outlines of the bale, as shown. Fig. 3 represents a bale pressed by sections, showing a sampling-ridge projecting at both the end of the bale and the corner. Fig. 4 represents a box-pressed bale, also showing a sampling-ridge at both the side and corner of the bale, but formed principally within the outlines of the bale. Either form is equally effective, and ordinarily but one sampling-ridge is required, and either form may be used on all styles of presses. Fig. 5 is a section through a baling-press having the present improvement embodied therein.

Fig. 1 illustrates a section of the box of a sectional baling-press, in which box the material is compressed. A slot or groove A is preferably shown in the bottom of the press and may extend not only through the press-box, but also through the bale-chamber of a sectional press to better protect the sampling-ridge, although a sample may be obtained without continuing the groove in the bale-chamber. This slot or groove may extend through the walls of the chamber or only part way, and I preferably form it larger at one end in the press-box at B and tapering down to the continuation in the bale-chamber in order to make certain of the cotton getting into the opening in sufficient quantity to form a sample, although an opening of sufficient size would furnish a sample if of equal width throughout, but would impair the surface of the bale more. If preferred, this sampling slot or groove may be in the corner, as also shown in Fig. 1.

Fig. 2 represents a section of an upright box of a box baling-press, in which I have shown strips C C nailed to the lining of the box inside and projecting into the box and far enough apart to form a slot or groove to furnish the size sampling-ridge required. I also show similar strips beveled and attached each side of the corner to leave a corner groove instead of side or end groove, if desired, thus in either case forming a loose-pressed sampling-ridge nearly flush with the outlines of the bales.

Either method shown in Figs. 1 and 2 is applicable to both presses, and instead of a continuous groove or slot it would be effective in sections or a hole, particularly so in box-presses, as Fig. 2 at D.

It should be observed that when the bale is removed from the press the ridge formed is free to expand and does expand both ways, and thereby becomes so loosely attached that the cotton may be picked off by hand to sample the bale, and the sample thus secured represents every charge or feed in the bale.

In Fig. 5 the invention is shown as embodied in one form of press illustrated in my prior patent, No. 583,462, dated June 1, 1897, and in this figure it will be seen that the sampling-spaces are formed by strips C C, secured to the walls of the press-boxes and extending up to the intersection, where the strips are united together. This form of press has been found to give excellent practical results; but the invention being of general applicability I do not wish to confine myself to any particular form of press.

Fig. 3 represents a bale with projecting sampling-ridges after expansion by removal from the press.

Fig. 4 represents a bale with sampling-ridges formed in the bale after expanding or removal from the press. As will be observed, the strips projecting in the box shown in Fig. 2 forms grooves into the walls of the bale, whereby the ridge of cotton formed between the strips is allowed to expand both ways into a loose sunken sampling-ridge.

Figure 5:
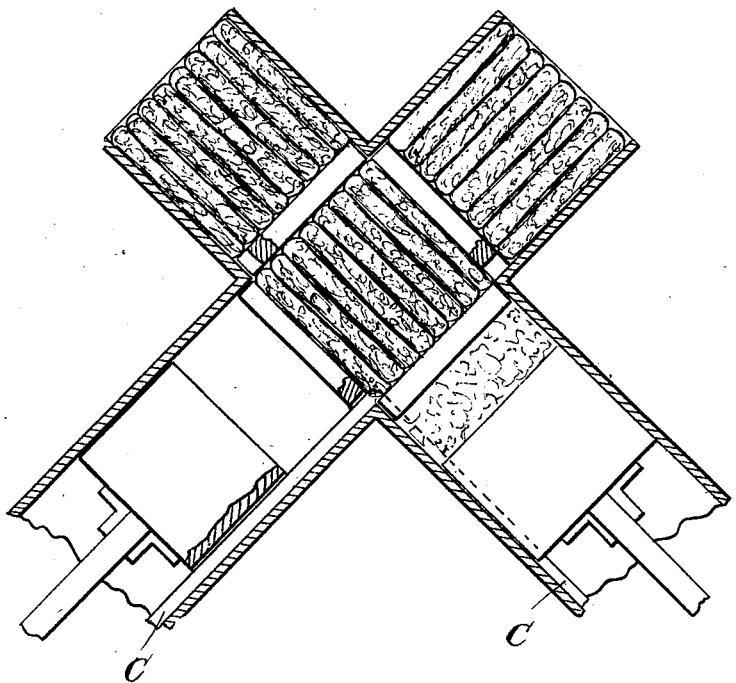

I do not confine myself to any particular form of slots or grooves, as all that is required is that an opening or series of openings or a groove or recess to form an expansion-space in the press-box be provided to form a bale with a lock or locks or ridges of loosely-attached cotton on the bale; but it will be noted that the expansion-space for forcing the sampling-section is located in that part of the press-box where the material is reduced from its relatively-loose state to its compressed state.

I make no claim herein to the bale formed with a sampling-tuft, as it is made the subject-matter of a divisional application filed October 10, 1899, Serial No. 733,170.

Having thus fully described my invention, what I claim, and desire to secure by Letters Patent, is—

1. A press for forming bales of fibrous material, having a chamber in which the material is reduced from a relatively-loose to a compressed condition, such chamber having an expansion-space other than the space or spaces for the application of the securing-bands for relieving the compression on a portion of the material to form a relatively-loose sampling-section on the bale; substantially as described.

2. A press for forming bales of fibrous material, embodying a chamber in which the material is reduced from a relatively-loose to a compressed condition, such chamber having a recess other than the space or spaces for the application of the securing-bands and into which a portion of the material may expand to form a relatively-loose sampling-section on the bale; substantially as described.

3. A press for forming bales of fibrous material, embodying a chamber in which the material is reduced from a relatively-loose to a compressed condition, such chamber having a relatively-long expansion-space other than the space or spaces for the application of the securing-bands, located in its wall extending in the direction of travel of the pressed material and into which a portion of the material may expand to form a relatively-loose sampling-section on the bale; substantially as described.

4. A press for forming bales of fibrous material, embodying a chamber in which the material is reduced from a relatively-loose to a compressed condition such chamber having a long narrow recess in its side wall other than the space or spaces for the application of the securing-bands, and into which a portion of the material may expand to form a relatively-loose sampling-section on the bale; substantially as described.

5. A press for forming bales of fibrous material, having a chamber in which the material is reduced from a relatively-loose to a compressed condition, such chamber having an expansion-space formed by inwardly-extending ribs into which space a portion of the material may expand to form a relatively-loose sampling-section on the completed bale; substantially as described.

PETER K. DEDERICK.

Witnesses:
R. J. VAN SCHOONHOVEN,
P. K. DEDERICK, Jr.